3,038,007
PROCESS FOR THE PREPARATION OF DL-THREONINE

Edward Wilkins Reeve, 4708 Harvard Road, College Park, Md.
No Drawing. Filed May 23, 1958, Ser. No. 737,193
7 Claims. (Cl. 260—534)

This invention relates to the preparation of amino acids. More particularly, it relates to the synthesis of dl-threonine. Still more particularly, this invention pertains to mixtures rich in the physiologically active threonine and to methods for making such compositions.

As is known, threonine and allothreonine differ in their stereochemical relationships; allothreonine is inactive physiologically whereas threonine is one of the essential amino acids. The most practical synthesis of dl-threonine is that of Pfister et al. described in J. Am. Chem. Soc. 71, 1101 (1949), However, the practical syntheses for threonine have always led to racemic mixtures in which the dl-allothreonine was the main component. Conversion of allothreonine to threonine, while effective, is an additional step which should preferably be eliminated or used only as a means for additional yields and savings. The solubility characteristics of the two stereoisomers are such that the dl-threonine is difficult to isolate by fractional crystallization or similar techniques. Thus, improved methods are needed.

An object of this invention is the provision of methods for preparing dl-threonine in improved yields. Another objective is the preparation of dl-threonine by methods leading to mixtures containing a majority of dl-threonine rather than the physiologically inactive dl-allothreonine. Still another objective is the provision of a hydrogenation reaction which reverses the normal stereochemical course. A still further object is the provision of new compositions of matter useful as precursors to amino acids. These and other objects will appear hereinafter.

The objectives of this invention are accomplished by selecting a starting product that leads to intermediates that are readily isolated and by effecting hydrogenation with a stereo-specific catalyst. By such steps, dl-threonine is produced in greater yield. The mixtures of dl-threonine and dl-allothreonine which result are richer in dl-threonine than hitherto made by a direct hydrogenation reaction. For example, the mixtures of this invention contain about 60% or better of dl-threonine. This ratio of about 60/40 of the active to inactive compounds is a striking advance over the previously available mixtures which were, in the main, in a ratio of 30/70 of the dl-threonine/dl-allothreonine, respectively. The description and equations below illustrate the processes of this invention.

The synthesis is illustrated in brief by the following equations showing the main reactions and products:

I.

$CH_3COCH_2CONHC_6H_5 + CH_3COOH + NaNO_2 \longrightarrow$
$CH_3COCCONHC_6H_5 + H_2O + CH_3COONa$
$\quad\quad\quad\parallel$
$\quad\quad\quad NOH$

II.

$CH_3COCCONHC_6H_5 + CH_3COOH + 2(CH_3CO)_2O + 2Zn \rightarrow$
$\parallel$
$NOH$
$\quad\quad CH_3COCHCONHC_6H_5 + 2(CH_3COO)_2Zn$
$\quad\quad\quad\quad\quad |$
$\quad\quad\quad\quad\quad NHCOCH_3$

III.

$CH_3COCHCONHC_6H_5 + H_2 \xrightarrow[\text{Raney cobalt}]{C_2H_5OH}$
$\quad |$
$NHCOCH_3$
$\quad\quad\quad\quad\quad\quad CH_3CHOHCHCONHC_6H_5$
$\quad\quad\quad\quad\quad\quad\quad\quad\quad\quad |$
IV. $\quad\quad\quad\quad\quad\quad\quad\quad\quad\quad NHCOCH_3$ $CH_3CHOHCHCONHC_6H_5 + 2H_2O + 2HCl \longrightarrow$
$\quad\quad |$
$\quad\quad NHCOCH_3$
$\quad CH_3CHOHCHCOOH + CH_3COOH + C_6H_5NH_2.HCl$
$\quad\quad\quad\quad |$
$\quad\quad\quad\quad NH_2.HCl$

V.

$CH_3CHOHCHCOOH + LiOH \longrightarrow$
$\quad\quad\quad |$
$\quad\quad\quad NH_2.HCl$
$\quad\quad\quad\quad\quad CH_3CHOHCHCOOH + LiCl + H_2O$
$\quad\quad\quad\quad\quad\quad\quad\quad\quad |$
$\quad\quad\quad\quad\quad\quad\quad\quad\quad NH_2$ The following examples are given for illustrative purposes only.

EXAMPLE I

In this experiment 500 grams (2.82 moles) of acetoacetanilide (compound 1) was placed in a vessel equipped with a thermometer and a stirrer. To this was added 365 ml. of glacial acetic acid, and the resultant suspension was cooled to 15° C. A sodium nitrite solution containing 200 g. (2.9 moles) of sodium nitrite and 480 ml. of water was added to the stirred suspension. The addition was effected at a rate such as to maintain a reaction temperature of 50–55° C. Upon completion, 100 ml. of water was added. The thick jell that formed was broken up and stirred in an ice bath for 15 minutes. After the mixture had stood for 1.5 hrs., the yellow precipitate was filtered and washed with three 100 ml. portions of cold water. The dried, crude alpha-oximinoacetoacetanilide (compound 2); M.P. 94–97° C., weighted 562 g. (96% yield). A portion was readily purified by recrystallization from cyclohexane to M.P. 97–98° C.

The crude product was placed in a 4 liter beaker and 2 liters of glacial acetic acid and 680 ml. of acetic anhydride were added with stirring. To the resultant solution cooled to 15° C. was added with vigorous stirring over a 1.5 hour period 709 g. (10.8 moles) of zinc dust, the rate of addition being such as to maintain a temperature of 60–65° C. The reaction mixture was stirred for an additional 15 minutes, and then allowed to stand for about half an hour. It was then filtered with suction and the precipitate, consisting of zinc dust and zinc acetate, was thoroughly washed with 600 ml. of methanol in 200 ml. portions. The combined filtrates were neutralized to a pH of 5 to 6 by the slow addition of a 40% sodium hydroxide solution, the temperature being controlled by the addition of ice. The alpha-acetamidoacetoacetanilide (compound 3), a new composition of matter, precipitated under these conditions, and it was filtered with suction and washed with a little water. A yield of 699 g. of crude, slightly damp material was obtained. This was recrystallized from eight liters of water yielding 412 g. of material melting at 158–159° C. Evaporation of the filtrate to dryness yielded 46 g. of product melting at 130–142° C. Recrystallization of this yielded 14 g. of material melting at 158–159° C. The combined yield of recrystallized material was 426 g., which is equivalent to a 69% yield. A sample of crude product was recrystallized to a constant melting point of 159.5–160° C. from n-butyl ether and analyzed as follows: Calcd. for $C_{12}H_{14}N_2O_3$: C, 61.62; H, 6.02; N, 11.96. Found: C, 61.45; H, 5.96; N, 12.05.

In effecting hydrogenation, 29.3 g. (0.125 mole) of alpha-acetamidoacetoacetanilide, was placed in a 300 ml. steel hydrogenation vessel together with 100 ml. of 95% ethanol and 2 g. of Raney cobalt catalyst. Hydrogen gas was admitted to a pressure of 145 atmospheres. Hydrogenation was carried out at 120° C. for one hour. A pressure drop of 20 atmospheres (107% of theory) was noted. The reaction mixture was filtered into a flask to remove the catalyst, and most of the alcohol was removed by distillation from a steam bath. The resultant alpha-acetamido-beta-hydroxy-N-phenylbutyramide (compound 4) was then hydrolyzed.

The condenser was attached vertically to the flask and 250 ml. of concentrated hydrochloric acid was added through the condenser. A glass wool plug was placed in the top of the condenser, and the solution was heated on a steam bath for 2 days. The resultant solution was then refluxed for 30 hours and allowed to stand overnight. Saturating the solution with hydrogen chloride gas accelerates the hydrolysis so that a shorter reaction time is sufficient. It was then evaporated to near dryness under water pump pressure while being heated on a steam bath. The residue was dissolved in 20 ml. of warm water. The resulting solution was transferred to a 150 ml. beaker and neutralized to a pH of 6 at first with solid lithium carbonate and finally with a 10% solution of lithium hydroxide. Fifty ml. of ether was added and the mixture was placed in a 100 ml. separatory funnel and shaken. The ether layer was separated from the water layer. Upon evaporation of the ether on a steam bath, an 80% yield of aniline was obtained. The water layer was filtered, five volumes of 95% ethanol added and the mixture allowed to stand for approximately 2 weeks. The precipitate formed was filtered off and washed with a little 95% ethanol. The amount of product, having the formula of compound 5, was 8.9 g., and it had a neutral equivalent of 124 by a Sorenson titration. This yield is equivalent to 60% of the theoretical amount. The following analysis was obtained by the solubility temperature method of Reeve et al., Anal. Chem. 22, 755 (1950): dl-threonine—56%; dl-allothreonine—36%.

EXAMPLE II

The substituted butyramide (compound 4) was prepared in the manner described in Example I. The amide was recrystallized and then hydrolyzed, the conditions of hydrolyses being varied to study the effect of the condition on the yield. The results are given in the following table.

*Hydrolysis of the Diastereoisomeric Phenylbutyramides*

| Hydrolysis Conditions | Percent Yield | Percent dl-Threonine | Percent dl-Allothreonine |
| --- | --- | --- | --- |
| Removal of Solvent and 4 hr. reflux with 6N HCl | 22 | 65 | 27 |
| At 80° C.-85° C. with conc. HCl for 10 hours | 62 | 67 | 25 |
| At 80° C.-85° C. with conc. HCl for 8 hours | 68 | 74 | 18 |

Saturation of the hydrolysis mixture after the hydrolysis had proceeded for several hours hastened the reaction. Hydrolysis times vary from about 10 to about 30 hours but shorter or longer times can be used depending on conditions of concentration, temperature, pressure and the like. In a variety of experiments, the overall yields of dl-threonine varied from about 35% to about 45%.

EXAMPLE III

The sequence of reactions shown graphically above was effected using N-o-tolylacetoacetamide instead of acetoacetanilide (compound 1). This lead to alpha-acetamide-N-o-tolylacetoacetamide, a new composition of matter, in 48% yield. *Analysis.*—Calcd. for $C_{13}H_{16}N_2O_3$: C, 62.89; H, 6.50; N, 11.29. Found: C, 62.81; H, 6.22; N, 11.57.

The details of the preparation are as follows: In a liter beaker, equipped with a stirrer and thermometer, were placed 105 g. (0.475 mole) of alpha-oximino-N-o-tolylacetoacetamide, 285 ml. of glacial acetic acid and 133 ml. of acetic anhydride. The stirrer was started and, while cooling the beaker in an ice bath, 84 g. (1.9 moles) of zinc dust was added at such a rate so as to maintain a temperature of 45–50° C. The entire mass solidified at this point. It was filtered and it was found upon neutralization of the filtrate with 40% sodium hydroxide that most of the desired acetamido compound was mixed with the unreacted zinc dust and zinc acetate. This mixture was extracted with 1.5 liters of boiling water. Upon cooling a precipitate formed which was filtered off yielding 46.7 g. of material melting at 163–168° C. This was combined with the material obtained by neutralization of the acetic acid in the original filtrate to give a total yield of 65.3 g. This was recrystallized from 1.5 liters of water producing 60 g. of material melting at 166–168° C. This is equivalent to a 51% yield. It was found that this compound can be best recrystallized from ethyl acetate (8.75 g. per 100 ml. of solvent); this raised its melting point to 172–173.5° C.

The alpha-acetamido-N-otolylacetoacetamide in 95% ethanol was hydrogenated at 140° C. with a pressure of hydrogen of 100 atmospheres using Raney cobalt as the catalyst. Hydrolysis led to a mixture rich in dl-threonine.

The experimental procedure was as follows: To 29 g. (0.17 mole) of alpha-acetamido-N-o-tolylacetoacetamide, contained in a 300 ml. steel hydrogenation vessel, were added 100 ml. of 95% ethanol and 2 g. of Raney cobalt. Hydrogen gas was admitted to a pressure of 100 atmospheres and the hydrogenation conducted at 140° for 1 hour. A pressure drop of 22 atmospheres (115% of theory) was noted. The reaction mixture was allowed to cool to room temperature by standing overnight. The hydrogenated material had precipitated out and was redissolved by heating the hydrogenation vessel on a steam bath. The resulting mixture was filtered while hot to remove the catalyst. After standing overnight a precipitate formed which weighed 16.9 g. and had a melting point of 170–207° C. Further evaporation of the filtrate produced another crop of crystals. The combined yield was 22 g. This was placed in a 250 ml. flask, 50 ml. of concentrated hydrochloric acid added and a condenser fitted with a plug of glass wool attached. After standing overnight crystals formed. Upon heating at 80–85° C. for seven hours on a steam bath these dissolved and upon standing overnight everything remained in solution. This solution was concentrated to a low volume under water pump pressure while being heated on a steam bath. The residue was dissolved in approximately 50 ml. of water and transferred to a 150 ml. beaker. Neutralization of the solution was carried out with lithium hydroxide to a pH of 6. Eighty ml. of ether was added, the mixture transferred to a separatory funnel and shaken. The water layer was separated from the ether layer. The ether layer was dried over calcium chloride and upon evaporation on a steam bath a 28% yield of o-toluidine was obtained. The water layer was evaporated to a volume of 30 ml. on a steam bath, filtered while hot, and an amount of alcohol equal to five times the volume of the aqueous solution was added. After standing for approximately a month, the precipitate which had formed was filtered yielding 4.4 g. of product, having a neutral equivalent of 120 by Sorenson titration. This amount is equivalent to a 32% yield. The following analysis was obtained by the solubility temperature procedure: percent dl-threonine, 54; percent dl-allothreonine, 34.

Similar results are obtained starting with the toluidides of beta-ketovaleric acid or with the anilide of beta-ketoheptoic acid.

From the above examples it can be seen that smooth reactions are involved in the processes of this invention and that good yields are obtained. In the first step, the nitrosation procedure occurs very rapidly to give almost quantitative yields of the isonitroso compounds. While acetic acid and sodium nitrite are used in the above examples as the medium and as the source of nitrous acid, other media and sources may be used. Instead of acetic acid there may be used such solvents as ethyl alcohol, other alcohols, ethyl ether and other ethers. Similarly, instead of sodium nitrite and acetic acid any of the following compounds may be employed as sources of nitrous acid: ispropylnitrite, other alkyl nitrites, nitrogen trioxide or any nitrite salt with an acid. Because of the ready availability and the solvent action resulting, acetic acid and sodium nitrite are generally used and preferred. In the nitrosation, the temperatures used are normally in the range of 15° C.–100° C. for the reaction is exothermic and control by cooling is usually required.

The amine used in preparing the amide of acetoacetic acid is preferably an aromatic amine. Thus, in the type formula

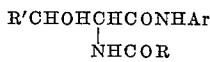

Ar is an aryl group such as —C₆H₅, —C₆H₄CH₃, —C₆H₃(CH₃)₂, C₆H₄C₂H₅ and the like. While a large variety of aromatic radicals can be used, the anilide, wherein Ar is C₆H₅—, is preferred both for the reasons of economy and because of its solubility behavior. These amides are readily made from the aromatic amines and diketene as for example:

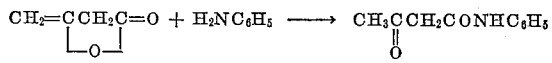

In the type formula given above, R is usually an alkyl group and a lower aliphatic group. Thus, R may be CH₃—, C₂H₅—, C₃H₇—, isobutyl, n-butyl, t-butyl, n-hexyl and the like. While longer chains and substituted alkyl radicals can be used, no particular advantage results therefrom. Other beta-ketonic acids may be used in the same manner as the acetoacetic derivatives. Thus, R' may have the values given above for R and the initial products can be derived from such beta-ketonic acids as beta-ketovaleric acid or beta-ketocaproic acid. Usually, acetic acid and acetic anhydride are used to convert the isonitroso compounds derived from the beta-keto compounds to the full amides by reduction. Zinc is normally used, although other metals or catalytic hydrogenation in the presence of acetic anhydride may be used instead. This reaction is also exothermic, and the temperatures used vary from about 15° C. to about 100° C.

If effecting the stereochemical reversal cobalt is preferred. It may be in one of several forms, as for example, cobalt on kieselguhr or supported on various other materials such as animal charcoal, asbestos, inert metallic oxides or carbonates or other metal. Of the various forms of cobalt catalysts, Raney cobalt is preferred. While a number of catalysts, such as platinum and Raney nickel, can be used in the hydrogenation of the alpha-acylamido ketones, these conventional catalysts do not lead to mixtures containing dl-threonine derivatives as the major constituent. Rather, those mixtures contain mostly the inactive allothreonine derivatives. The use of Raney cobalt is decidedly advantageous. The hydrogenation is carried out under pressures varying from about one to about 500 atmospheres and at temperatures varying from about 50° C. to about 150° C. As is usual, the drop in pressure, indicating hydrogen take-up or reaction, is followed, and the reaction time varies depending upon the rate of take-up, the pressure, the compound being reduced and similar factors. Normally, the reaction is completed in about 1 to 2 hours.

Hydrolysis of the resultant hydroxyamides can be effected using acids and temperatures different than shown above. Hydrochloric acid may be replaced by hydrobromic acid or other strong acids. Generally, mild hydrolysis conditions are used, and some of the solvent used in the hydrogenation may be present during the hydrolysis for reasons of convenience.

If it is desired, the resultant mixture can be separated into its components, as, for example, by the sodium salt procedure of Shabica, U.S. 2,461,847. Also, the allothreonine or its derivatives can be converted into threonine by such procedures as are described by Pfister et al., U.S. 2,446,192. If desired, the mixtures resulting from the hydrogenation may be used directly, with or without hydrolysis and without separation of the organic components.

The process and the compositions of this invention afford a significant advance in the amino acid field. Of the various essential amino acids dl-threonine is the most difficult to synthesize. Further, it is very difficult to separate it or its racemic mixtures from other isomers. By this invention dl-threonine is not only readily synthesized but it is produced in a fashion that minimizes the separation problem. The amino acid mixtures produced are rich in dl-threonine, and dl-allothreonine is made in low quantities. The synthesis is most practical, for the desired, essential component is readily made at the lowest cost. Further, the mixture is so high in the essential amino acid that direct use in animal nutrition without removing the allothreonine is possible.

While the invention has been disclosed herein in connection with certain embodiments and certain structural and procedural details, it is clear that changes, modifications or equivalents can be used by those skilled in the art; accordingly, such changes within the principles of this invention are intended to be included within the scope of the claims below.

I claim:
1. A process for the synthesis of a stereoisomeric mixture of compounds which have the formula

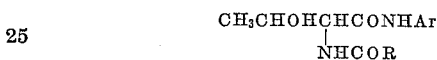

which mixture contains a majority of a dl-threonine stereoisomer/precursor which process comprises contacting a compound of the formula

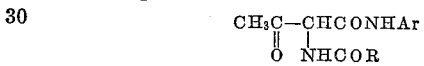

with hydrogen in the presence of a cobalt metal catalyst to hydrogenate the said compound to produce said mixture, the Ar in the above formulas being an aryl group and the said R in the above formulas being a lower alkyl group.

2. A process in accordance with claim 1 in which the said catalyst is Raney cobalt.

3. The process of claim 1 wherein the said cobalt catalyst is suspended on an inert carrier.

4. The process of claim 1 wherein the hydrogenation is carried out at a pressure of about 1 to about 500 atmospheres and at a temperature from about 50° C. to about 150° C.

5. A process in accordance with claim 1 which includes the step of hydrolyzing the resultant stereoisomeric mixture to produce a mixture of dl-threonine and dl-allothreonine containing a major proportion of dl-threonine.

6. A process for the synthesis of a stereoisomeric mixture of compounds which have the formula

which mixture contains a majority of a dl-threonine stereoisomer/precursor which process comprises contacting a compound of the formula

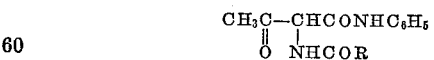

with hydrogen in the presence of a cobalt metal catalyst to hydrogenate the said compound to produce said mixture, the said R in the above formulas being a lower alkyl group.

7. A process for the synthesis of a stereoisomeric mixture of compounds which have the formula

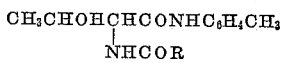

which mixture contains a majority of the dl-threonine stereoisomer/precursor which process comprises contacting a compound of the formula

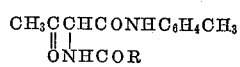

with hydrogen in the presence of a cobalt metal catalyst to hydrogenate the said compound to produce said mixture, the said R in the above formulas being a lower alkyl group and the said —$C_6H_4CH_3$ being o-tolyl.

References Cited in the file of this patent

UNITED STATES PATENTS

| | | |
|---|---|---|
| 2,530,627 | Pfister et al. | Nov. 21, 1950 |
| 2,572,020 | Floyd | Oct. 23, 1951 |
| 2,695,309 | Carrara | Nov. 23, 1954 |
| 2,851,494 | Ehrhart et al. | Sept. 9, 1958 |
| 2,876,262 | Ehrhart et al. | Mar. 3, 1959 |

FOREIGN PATENTS

| | | |
|---|---|---|
| 547,857 | Canada | Oct. 22, 1957 |
| 637,592 | Great Britain | May 24, 1950 |